United States Patent
Galati Giordano et al.

(10) Patent No.: US 11,595,148 B2
(45) Date of Patent: Feb. 28, 2023

(54) ENSURING TRANSMISSIONS ARE COMPLETED IN A WIRELESS NETWORK

(71) Applicant: NOKIA TECHNOLOGIES OY, Espoo (FI)

(72) Inventors: Lorenzo Galati Giordano, Stuttgart (DE); Mika Kasslin, Espoo (FI); Nuno Manuel Kiilerich Pratas, Gistrup (DK); Adrian Garcia Rodriguez, Santa Cruz de Tenerife (ES); Claudio Rosa, Randers NV (DK); Olli Alanen, Vantaa (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 2 days.

(21) Appl. No.: 17/336,741

(22) Filed: Jun. 2, 2021

(65) Prior Publication Data

US 2021/0385001 A1    Dec. 9, 2021

(30) Foreign Application Priority Data

Jun. 3, 2020    (FI) .................................... 20205579

(51) Int. Cl.
*H04K 3/00* (2006.01)
*H04L 1/00* (2006.01)
(Continued)

(52) U.S. Cl.
CPC ............. *H04K 3/226* (2013.01); *H04K 3/255* (2013.01); *H04L 1/0003* (2013.01);
(Continued)

(58) Field of Classification Search
CPC ....... H04K 3/255; H04L 1/0003; H04L 45/24; H04W 24/04; H04W 72/0446; H04W 72/082; H04W 76/15
(Continued)

(56) References Cited

U.S. PATENT DOCUMENTS

| | | |
|---|---|---|
| 9,450,658 B1 | 9/2016 | Moon et al. |
| 2018/0124863 A1 * | 5/2018 | Hellgren .............. H04W 28/00 |
| 2018/0248647 A1 | 8/2018 | Di Taranto et al. |

FOREIGN PATENT DOCUMENTS

| | | | |
|---|---|---|---|
| WO | WO-2017032463 A1 * | 3/2017 | .......... H04L 1/0003 |
| WO | WO 2018/010542 A1 | 1/2018 | |

OTHER PUBLICATIONS

Grover et al., "Jamming and anti-jamming techniques in wireless networks: A survey", Int. J. Ad Hoc and Ubiquitous Computing. (Year: 2014).*

(Continued)

*Primary Examiner* — Intekhaab A Siddiquee
(74) *Attorney, Agent, or Firm* — Squire Patton Boggs (US) LLP

(57) ABSTRACT

A method comprising determining that interference may occur in a wireless network an apparatus is connected to, obtaining a first link that is of a first type, obtaining a second link that is of a second type, determining data to be transmitted from the apparatus to another apparatus connected to the wireless network, determining that a transmission occurs in the first link and transmitting the data in the second link, wherein the transmission in the first link has a longer duration than transmitting the data in the second link and the transmission in the first link and transmitting the data in the second link overlap in time.

18 Claims, 10 Drawing Sheets

(51) Int. Cl.
*H04L 45/24* (2022.01)
*H04W 24/04* (2009.01)
*H04W 72/04* (2009.01)
*H04W 72/08* (2009.01)
*H04W 76/15* (2018.01)
*H04W 72/0446* (2023.01)

(52) U.S. Cl.
CPC ............ *H04L 1/0009* (2013.01); *H04L 45/24* (2013.01); *H04W 24/04* (2013.01); *H04W 72/0446* (2013.01); *H04W 72/082* (2013.01); *H04W 76/15* (2018.02)

(58) Field of Classification Search
USPC ......................................................... 370/329
See application file for complete search history.

(56) References Cited

OTHER PUBLICATIONS

Extended European Search Report dated Oct. 28, 2021 corresponding to European Patent Application No. 21173527.9.

\* cited by examiner

ENSURING TRANSMISSIONS ARE COMPLETED IN A WIRELESS NETWORK

FIELD

The following exemplary embodiments relate to wireless communication and completing transmissions in a wireless network.

BACKGROUND

Wireless communication networks allow apparatuses such as terminal devices to be connected to a network and transmit and receive data wirelessly even when a terminal device is moving. An apparatus may further have a multi-link capability allowing the apparatus to be connected to multiple channels and/or bands simultaneously. Wireless transmission may be prone to interference and therefore it is desirable to ensure that interference does not prevent successful transmission of data in a wireless network.

BRIEF DESCRIPTION

The scope of protection sought for various embodiments of the invention is set out by the independent claims. The exemplary embodiments and features, if any, described in this specification that do not fall under the scope of the independent claims are to be interpreted as examples useful for understanding various embodiments of the invention.

According to another aspect there is provided an apparatus comprising means for determining that interference may occur in a wireless network the apparatus is connected to, obtaining a first link that is of a first type, obtaining a second link that is of a second type, determining data to be transmitted from the apparatus to another apparatus connected to the wireless network, determining that a transmission occurs in the first link and transmitting the data in the second link, wherein the transmission in the first link has a longer duration than transmitting the data in the second link and the transmission in the first link and transmitting the data in the second link overlap in time.

According to another aspect there is provided an apparatus comprising at least one processor, and at least one memory including a computer program code, wherein the at least one memory and the computer program code are configured, with the at least one processor, to cause the apparatus to: determine that interference may occur in a wireless network the apparatus is connected to, obtain a first link that is of a first type, obtain a second link that is of a second type, determine data to be transmitted to another apparatus connected to the wireless network, determine that a transmission occurs in the first link and transmit the data in the second link, wherein the transmission in the first link has a longer duration than transmitting the data in the second link and the transmission in the first link and transmitting the data in the second link overlap in time.

According to another aspect there is provided a method comprising determining that interference may occur in a wireless network an apparatus is connected to, obtaining a first link that is of a first type, obtaining a second link that is of a second type, determining data to be transmitted from the apparatus to another apparatus connected to the wireless network, determining that a transmission occurs in the first link and transmitting the data in the second link, wherein the transmission in the first link has a longer duration than transmitting the data in the second link and the transmission in the first link and transmitting the data in the second link overlap in time.

According to another aspect there is provided a computer program product readable by a computer and, when executed by the computer, configured to cause the computer to execute a computer process comprising determining that interference may occur in a wireless network an apparatus is connected to, obtaining a first link that is of a first type, obtaining a second link that is of a second type, determining data to be transmitted from the apparatus to another apparatus connected to the wireless network, determining that a transmission occurs in the first link and transmitting the data in the second link, wherein the transmission in the first link has a longer duration than transmitting the data in the second link and the transmission in the first link and transmitting the data in the second link overlap in time.

According to another aspect there is provided a computer program product comprising computer-readable medium bearing computer program code embodied therein for use with a computer, the computer program code comprising code for performing determining that interference may occur in a wireless network an apparatus is connected to, obtaining a first link that is of a first type, obtaining a second link that is of a second type, determining data to be transmitted from the apparatus to another apparatus connected to the wireless network, determining that a transmission occurs in the first link and transmitting the data in the second link, wherein the transmission in the first link has a longer duration than transmitting the data in the second link and the transmission in the first link and transmitting the data in the second link overlap in time.

According to another aspect there is provided a computer program comprising instructions for causing an apparatus to perform at least the following: determining that interference may occur in a wireless network an apparatus is connected to, obtaining a first link that is of a first type, obtaining a second link that is of a second type, determining data to be transmitted from the apparatus to another apparatus connected to the wireless network, determining that a transmission occurs in the first link and transmitting the data in the second link, wherein the transmission in the first link has a longer duration than transmitting the data in the second link and the transmission in the first link and transmitting the data in the second link overlap in time.

According to another aspect there is provided a computer readable medium comprising program instructions for causing an apparatus to perform at least the following: determining that interference may occur in a wireless network an apparatus is connected to, obtaining a first link that is of a first type, obtaining a second link that is of a second type, determining data to be transmitted from the apparatus to another apparatus connected to the wireless network, determining that a transmission occurs in the first link and transmitting the data in the second link, wherein the transmission in the first link has a longer duration than transmitting the data in the second link and the transmission in the first link and transmitting the data in the second link overlap in time.

According to another aspect there is provided a non-transitory computer readable medium comprising program instructions for causing an apparatus to perform at least the following: determining that interference may occur in a wireless network an apparatus is connected to, obtaining a first link that is of a first type, obtaining a second link that is of a second type, determining data to be transmitted from the apparatus to another apparatus connected to the wireless network, determining that a transmission occurs in the first link and transmitting the data in the second link, wherein the transmission in the first link has a longer duration than transmitting the data in the second link and the transmission in the first link and transmitting the data in the second link overlap in time.

LIST OF DRAWINGS

In the following, the invention will be described in greater detail with reference to the embodiments and the accompanying drawings, in which FIG. 1 illustrates an exemplary embodiment of a radio access network.

DESCRIPTION OF EMBODIMENTS

Figure 1:
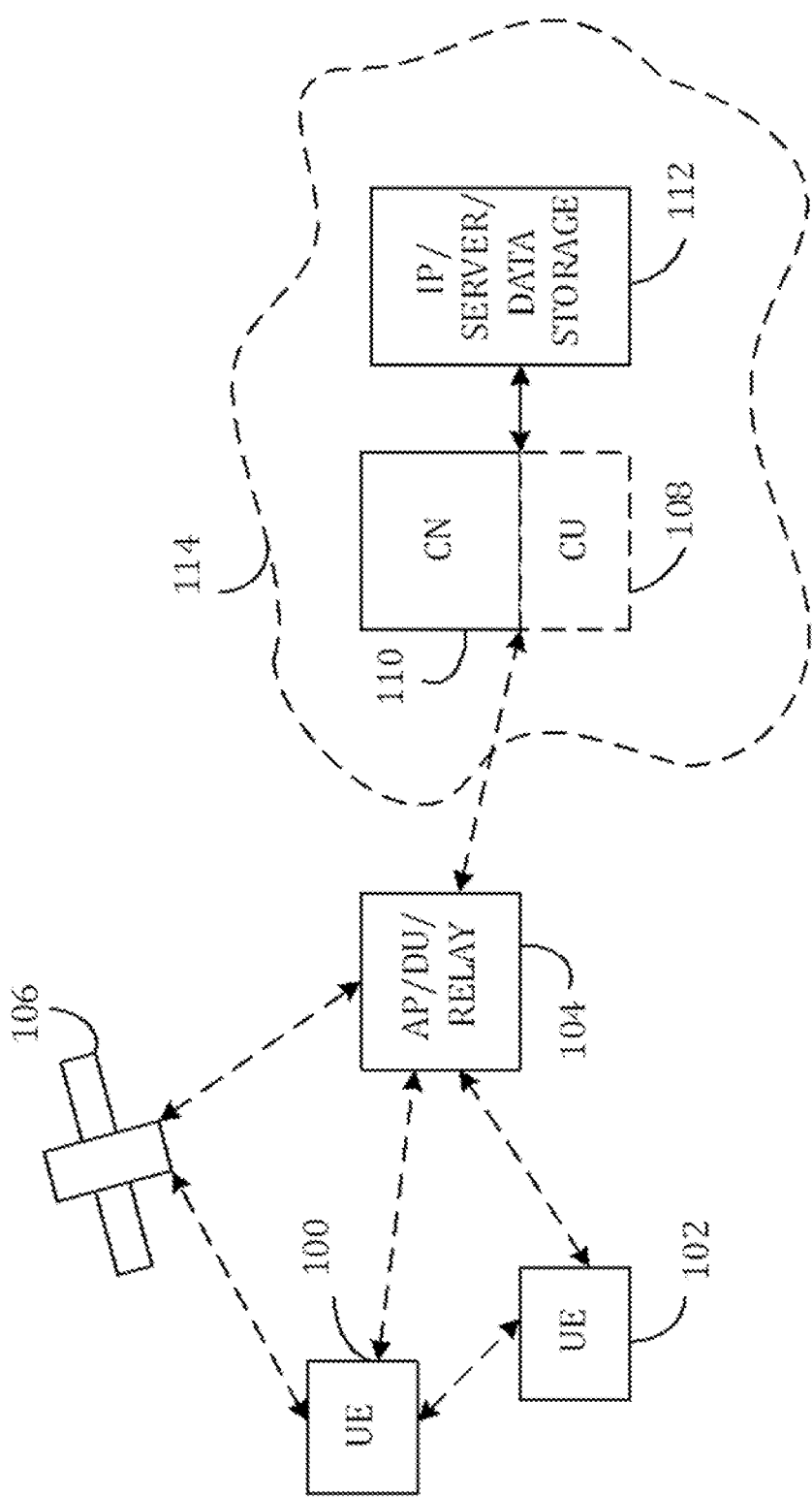

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, microcontrollers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via any suitable means. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments described herein may be implemented in a communication system, such as in at least one of the following: Global System for Mobile Communications (GSM) or any other second generation cellular communication system, Universal Mobile Telecommunication System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G) mobile or cellular communication system. The embodiments are not, however, restricted to the system given as an example but a person skilled in the art may apply the solution to other communication systems provided with necessary properties.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may comprise also other functions and structures than those shown in FIG. 1. The example of FIG. 1 shows a part of an exemplifying radio access network.

FIG. 1 shows terminal devices 100 and 102 configured to be in a wireless connection on one or more communication channels in a cell with an access node (such as (e/g)NodeB) 104 providing the cell. The access node 104 may also be referred to as a node. The physical link from a terminal device to a (e/g)NodeB is called uplink or reverse link and the physical link from the (e/g)NodeB to the terminal device is called downlink or forward link. It should be appreciated that (e/g)NodeBs or their functionalities may be implemented by using any node, host, server or access point etc. entity suitable for such a usage. It is to be noted that although one cell is discussed in this exemplary embodiment, for the sake of simplicity of explanation, multiple cells may be provided by one access node in some exemplary embodiments.

A communication system may comprise more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The (e/g)NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side may be a serving gateway (S-GW, routing and forwarding user data packets), packet data network gateway (P-GW), for providing connectivity of terminal devices (UEs) to external packet data networks, or mobile management entity (MME), etc.

The terminal device (also called UE, user equipment, user terminal, user device, etc.) illustrates one type of an apparatus to which resources on the air interface are allocated and assigned, and thus any feature described herein with a terminal device may be implemented with a corresponding apparatus, such as a relay node. An example of such a relay node is a layer 3 relay (self-backhauling relay) towards the base station. Another example of such a relay node is a layer 2 relay. Such a relay node may contain a terminal device part and a Distributed Unit (DU) part. A CU (centralized unit) may coordinate the DU operation via F1AP-interface for example.

The terminal device may refer to a portable computing device that includes wireless mobile communication devices operating with or without a subscriber identification module (SIM), or an embedded SIM, eSIM, including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be an exclusive or a nearly exclusive uplink only device, of which an example is a camera or video camera loading images or video clips to a network. A terminal device may also be a device having capability to operate in Internet of Things (IoT) network which is a scenario in which objects are provided with the ability to transfer data over a network without requiring human-to-human or human-to-computer interaction. The terminal device may also utilize cloud. In some applications, a terminal device may comprise a small portable device with radio parts (such as a watch, earphones or eyeglasses) and the computation is carried out in the cloud. The terminal device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G may require to bring the content close to the radio which may lead to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, and/or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology that may be used includes for example Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is to be noted that the depicted system is an example of a part of a radio access system and the system may comprise a plurality of (e/g)NodeBs, the terminal device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In some exemplary embodiments, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. A network which is able to use "plug-and-play" (e/g)NodeBs, may include, in addition to Home (e/g)NodeBs (H(e/g)nodeBs), a home node B gateway, or HNB-GW (not shown in FIG. 1). A HNB Gateway (HNB-GW), which may be installed within an operator's network may aggregate traffic from a large number of HNBs back to a core network.

Point to multi-point, PTM, transmission may be understood as a transmission in which an access node transmits the same transmission to multiple terminal devices. Multicast and broadcast may be understood as examples of PTM. In Long Term Evolution-Advanced (LTE-A)'s, for example, enhanced Multimedia Broadcast Multicast Service, eMBMS, PTM transmissions may be performed using one cell, in other words using a single cell PTM, SC-PTM, or using MBMS over a single frequency network, MBSFN, transmission that utilizes multiple cells, in other words, utilizes a multi-cell PTM, MC-PTM. The SC-PTM may use radio access parameters for unicast and share the same channels whereas MBSFN may use separate radio access parameters and channels. For 5G, single-cell and multi-cell PTM transmissions may be supported on a common radio access framework with 5G new radio, NR. Such functionality may be called as mixed-mode broadcast.

As cells that are adjacent to each other transmit the same transmission in a multi-cell transmission, there may not be a need to avoid interference, that may occur near the edge of a cell, using inter-cell-interference control measures. As adjacent cells are used to transmit the same transmission, inter-cell interference may be reduced or, in some exemplary embodiments, even a constructive interface may be achieved.

A transmission area may be understood as an area where a service is provided using one or more PTM transmissions. A transmission area may be dynamically configured with various PTM transmissions, such as SC-PTM and/or MC-PTM, within the transmission area. Accordingly, if a service requires data to be transmitted, that may be achieved using various independent SC-PTM and/or MC-PTM transmission schemes. A transmission scheme used may use optimized network settings based on, at least partly, for example distribution of terminal devices within the transmission area. For example, cells that have a large concentration of terminal devices near edges of the cells may utilize MC-PTM and if a cell has high concentration of terminal devices near the centre of the cell, SC-PTM may be utilized.

If SC-PTM and/or MC-PTM transmissions are independent transmissions, they may use their own optimized network settings such as optimized modulation and coding scheme, MCS, and optimized radio resource scheduling, which takes into account factors such as cell load and multiplexing with other services. Therefore, in some exemplary embodiments, progress of transmissions may vary between the independent SC-PTM and/or MC-PTM transmissions. For example, if there are bursts in the transmission, the variation in progress between the independent transmissions may be considerable. If in such exemplary embodiment a terminal device that is receiving the transmission, is located near an edge of a cell and is to move across the cell boundary, it is beneficial to avoid a situation in which a handover or a cell reselection is performed between adjacent cells, wherein the transmission progress of independent PTM transmissions is not synchronized and may thereby cause the terminal device to experience disturbances, such as packet loss, in the transmission it receives. It is to be noted that handover and cell reselection may be both be referred to as mobility. Thus, a terminal device may perform mobility at cell boundaries of independent PTM transmissions. If the independent PTM transmissions are asynchronous, then there is a possibility that packet loss occurs.

In addition to cellular communication networks, also other type of networks may be utilized for wireless communication. For example, Wi-Fi and Bluetooth provide wireless communication for device. Wi-Fi may be understood as a group of wireless networking technologies that are based on the IEEE 802.11 standards that may be used for local area networking of devices and Internet access. Wi-Fi utilizes the IEEE 802 protocol family, and devices using Wi-Fi based wireless communication use wireless access points. The different versions of Wi-Fi are specified by various IEEE 802.11 protocol standards, with the different radio technologies determining radio bands, and the maximum ranges, and speeds that may be achieved.

It is currently envisaged that requirements for reliable and fast wireless data transmission will increase. As for example usage of augmented and virtual reality enhanced applications increase, so does the requirements for reliable data transmission. Also, industry 4.0 also increases demand for fast and reliable data transmission. Industry 4.0 may be understood as utilizing automation and data exchange, such as cyber-physical systems, the internet of things, industrial internet of things, cloud computing, cognitive computing and artificial intelligence in manufacturing technologies and processes. Industry 4.0 may include for example a smart factory concept in which there may be modular structured smart factories and cyber-physical systems that monitor physical processes, create a virtual copy of the physical world and make decentralized decisions. Over the Internet of Things, cyber-physical systems may communicate and cooperate with each other and with humans in real-time both internally and across organizational services offered and used by various parties. Thus, it is evident that there are strict reliability and availability requirements for data transmission, which may be performed using a wireless network, included in industry 4.0 related concepts. Such requirements are addressed for example in the context of 5G by having a URLLC category. URLLC is targeted to enable delay-sensitive service use cases such as autonomous driving, remote control, factory automation and vehicle-to-vehicle communication. URLLC is to support low-latency transmissions of small payloads while having high reliability requirements.

Some of the use cases, like those included in the industry 4.0 for example, may operate on unlicensed frequency bands. For the purpose of achieving high-speed broadband communication, for example, frequencies with short wavelength may be utilized. Examples of such frequencies include millimetre wave and also other frequency bands, such as unlicensed band at 5 GHZz.

In an unlicensed spectrum, devices may utilize the spectrum without a license but are still to comply with the technical requirements associated with the spectrum. Unlicensed spectrum may be considered as a shared medium and devices utilizing the unlicensed spectrum may be subjected to interference. Examples of technologies operating in the unlicensed spectrum comprise Wi-Fi and unlicensed 5G, 5G NR-U.

As the reliability and latency, in terms of low latency, are high, interference should be minimized. The interference may be caused intentionally or unintentionally. As an example of intentional interference, there are devices that are used for the purpose of interfering transmissions. Such devices may be called as network jammers or jammers. Jammers may inject interference with the purpose of performing a "denial of service" attack. Some jammers may be reactive jammers. Reactive jammers are capable of sensing a channel and creating interference when a transmission is observed. This type of jammers may be very dynamic and thus difficult to be detected. Further, if such a reactive jammer is stationed for example outside a smart factory, it may be capable of blocking critical transmissions and thereby may cause significant damage to the factory by impacting production and safety and thereby causing economic losses that may be significant.

To tackle the interference issue described above, various techniques may be utilized. For example, transmit redundancy that utilizes transmission of a replica of a packet over multiple wireless links, that may be combined at the receiver, thereby increasing the possibility of successful reception, may be used. This may be beneficial provided that the number of replicas, i.e. number of links used for transmission, is greater than the number of links that can be interfered by the jammer at the same time. Yet, in some examples, a reactive jammer may be able to jump from one link, where the transmission is already over, to another, where the transmission is still ongoing, thereby preventing successful reception of at least a full packet among all the ones transmitted over the links. However, if it is known where the jammer is focusing its interfering action, that may enable utilizing that knowledge by attracting the jammer towards certain one or more links. If the jammer is attracted towards certain one or more links, other link may be left free from the interference caused by the jammer and that may enable more secure transmission of one or more data packets. This may be beneficial for example in URLLC communication in the unlicensed spectrum, where the condition and fluctuation of the wireless channel and the channel access contention rules may play a role between meeting the latency and reliability constraints of a packet or not.

In some other examples, interference caused by the jammer may be prevented using multi-link hopping. In multi-link hopping transmission may be retried on another link in case presence of a jammer detected. Multi-link hopping therefore provides a limited time window for safe transmission before the reactive jammer detects the new transmission and causes interference to the new link.

Wireless networks, such as 5G NR-U, which is the version of 5G NR operating in the unlicensed spectrum and may also be referred to as 5G-U, and Wi-Fi, may utilize a multi-link feature that allows multiple frequency bands to be used simultaneously for a transmission of data. Data may comprise one or more data packets that are to be transmitted from one apparatus to another using a wireless network. A link may be understood as a channel of a single or multiple frequency bands. A benefit of utilizing the multi-link feature is that peak throughput may be increased as multiple channels or links are used simultaneously. A further benefit of utilizing the multi-link feature is that channel access delay, that may be associated to the operation in the unlicensed spectrum, may be decreased as an apparatus may simultaneously contend on multiple channels or links and select the first one available for data transmission.

Figure 2:
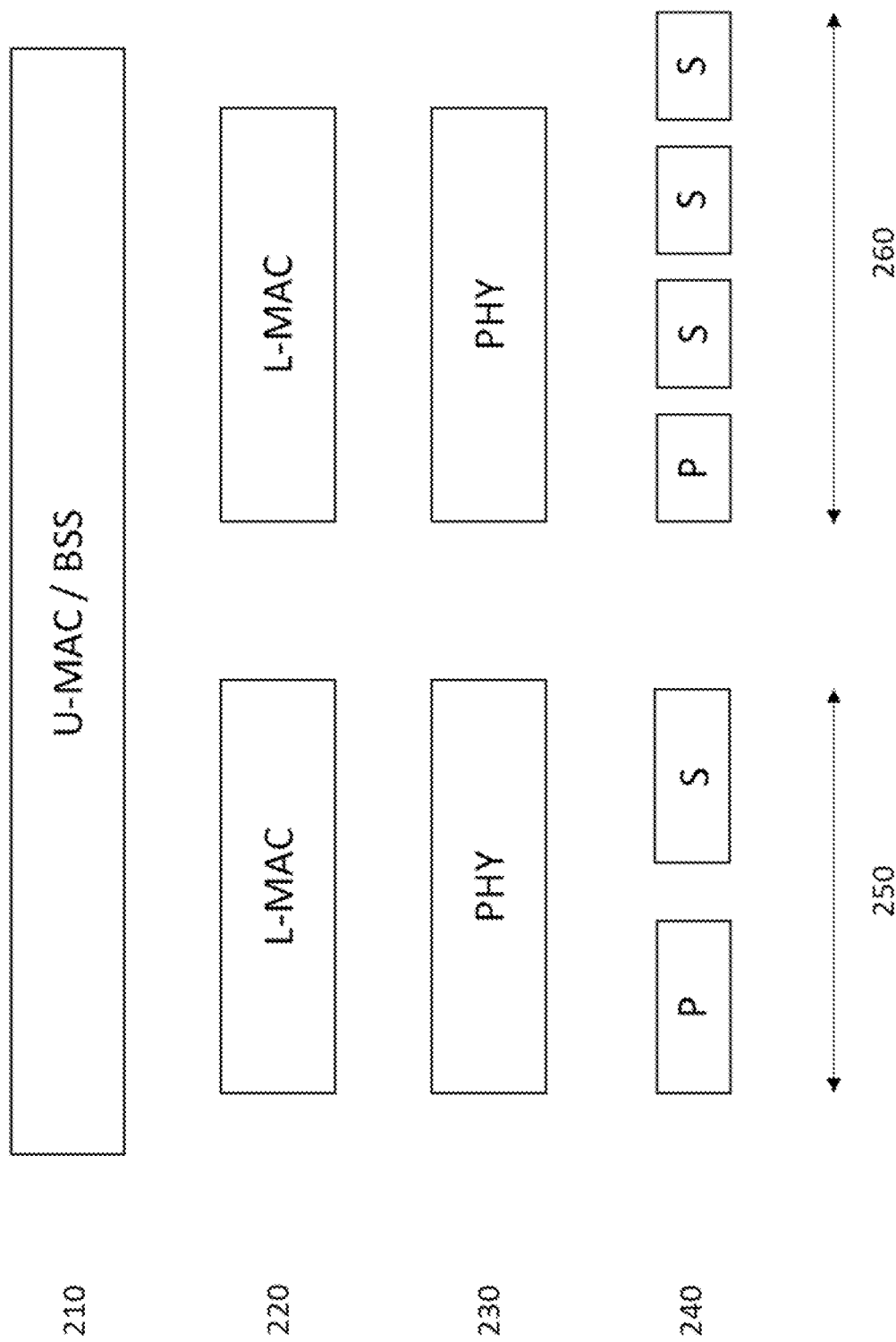
FIG. 2 illustrates an exemplary embodiment of a protocol stack.

FIG. 2 illustrates an exemplary embodiment of a protocol stack that could be used for implementing multi-link feature in IEEE 802.11 based wireless network. The multi-link feature allows devices to dynamically operate on several channels and/or bands. An apparatus that is compatible with the multi-link feature may thus operate in a multi-link mode. In this exemplary embodiment, two links, links 250 and 260, may be used simultaneously. It may be understood that the first link and the second link are part of a multi-link operation. Layer 210 illustrates the upper MAC, U-MAC, or basic service set, BSS, layer. The next layer, 220, is the lower MAC, L-MAC layer. As can be seen from FIG. 2, there is an L-MAC layer for link 250 and for link 260 respectively. The next layer, 230, is the physical layer PHY. Again, there are PHY layers respectively for link 250 and link 260. Next, on layer 240, there are multiple frequency bands within the frequency ranges of links 250 and 260. For each link, there may be one primary frequency band, P, and one or more secondary frequency bands, S. In this exemplary embodiment, the link 250 is a 40 MHz link that operates at 2.4 GHz carrier frequency and the link 260 is a 80 MHz link operating at 5 GHz carrier frequency. If data is to be transmitted, a data packet comprised in the data may be transmitted through any frequency band or link in an unlicensed spectrum provided that a channel to be used is determined to be free. The channel may be determined to be free by using a so called listen before talk, LTB, procedure.

Although reactive jammers may be capable of transmitting interference over multiple channels or links after detecting a transmission, their radio frequency chains may be limited. This may result in the reactive jammer not being capable to produce interference over all the possible available channels or links that are present for example in an unlicensed frequency spectrum. For example, a jammer may have the capability to jam up to maximum 6/8 frequencies at the same time. The jammer may further be capable of jamming both licensed frequencies and unlicensed ones. For example, the jammer may generate an interference mask between 100 MHz and 400 MHz. In some exemplary embodiments, the larger the mask, the lower the interfering power that may be applied, thus the range of the interference as scaling up the transmitting power required for a larger mask may cause the size of the jammer and its cooling system to be increased thereby increasing the possibility of visually detecting the jammer. Thus, the jammer may not be capable of simultaneously interfering over the entire bandwidth present at 2.4 GHz, 5 GHz and 6 GHz. Thus, the multi-link feature may be used in a wireless network communication to prevent interference caused by a jammer that may be a reactive jammer.

Figure 3:
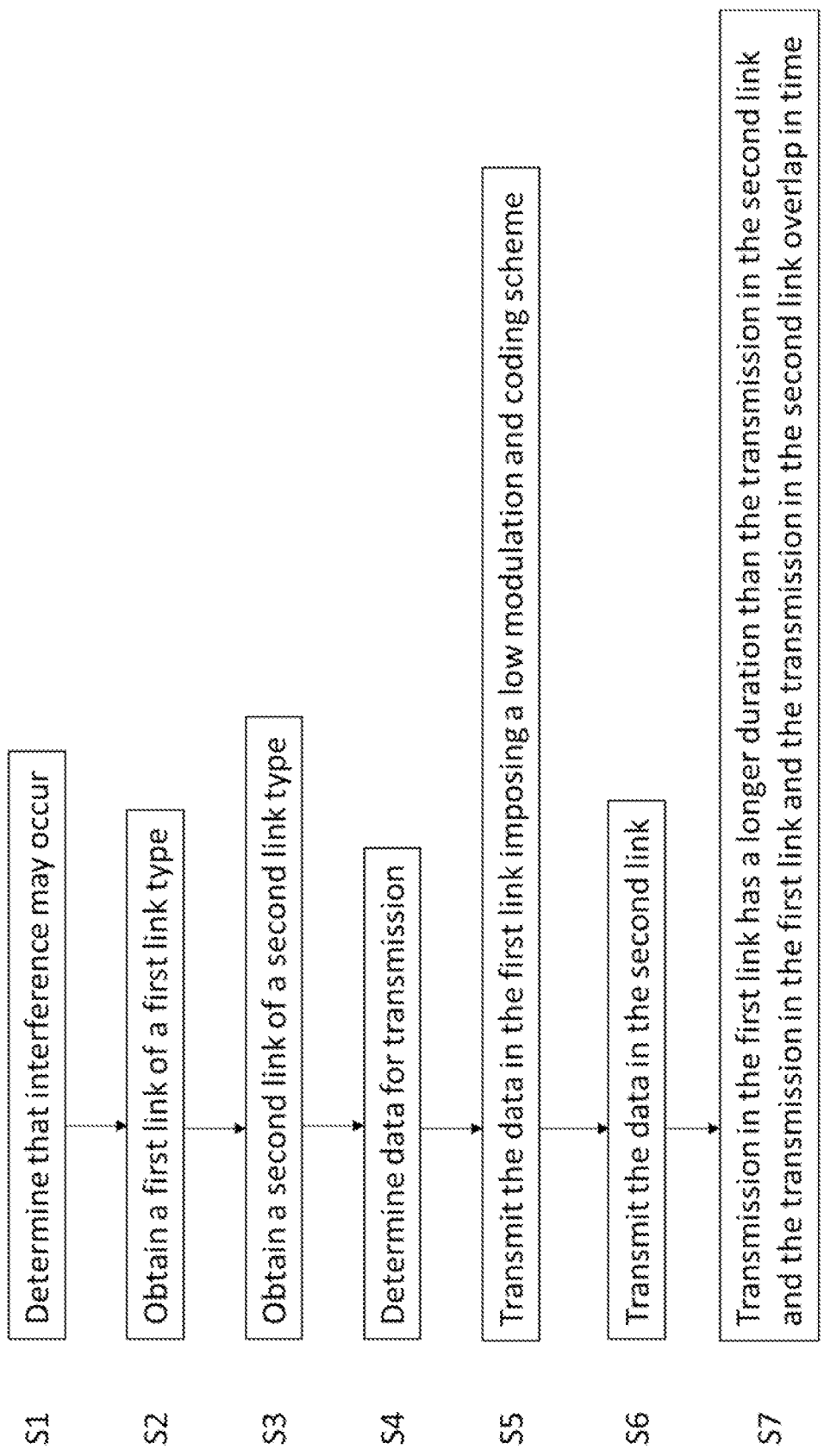
FIG. 3 illustrates a flow chart according to an exemplary embodiment.

FIG. 3 illustrates a flow chart according to an exemplary embodiment. First, in S1, it is determined that interference may occur. This may be due to detecting a presence of a jammer such as a reactive jammer or as a precautionary measure for example. Further, in this exemplary embodiment, the multi-link feature is available. Next, in S2, a first link of a first type is obtained. This may be done for example by creating the link by the apparatus that needs the link to transmit data to another apparatus. In this exemplary embodiment, the first link type is an expected jammed link. In S3, a second link of a second type is obtained. This too may be done by creating the link by the apparatus that needs the link to transmit data to the other apparatus. In this exemplary embodiment the second link type is a non-jammed link. Next, in S4, the data for transmission is determined which may comprise obtaining the data. Then in S5 the data is transmitted in the first link imposing a low modulation and coding scheme, MCS. Low MCS may be understood as the first link having a lower data rate than the MCS of the second link. Next, in S6, the data is transmitted in the second link. As described in S6, the transmission in the first link has a longer duration than the transmission in the second link and the transmissions overlap in time.

In some exemplary embodiments, the transmission in the non-jammed link overlaps entirely in time with the transmission in the expected jammed link. The non-jammed link may be targeted to ensure data packets are received as expected from the other apparatus. The apparatus that obtains the first and the second link may determine e.g. which frequency resources are used and when the transmissions happen when obtaining the first and the second link. The expected jammed link may be targeted to attract one or more reactive jammers. It is to be noted that in addition to the expected jammed link, there may also be other expected jammed links, in other words, it is possible to have more than one expected jammed link. In some alternative exemplary embodiment, the expected jammed links may be implemented by other apparatuses than the one that has the need to transmit data. In other words, obtaining the first link may comprise utilizing transmissions of other apparatuses as a basis of expected jammed links and obtaining the second link accordingly.

Transmission in the expected jammed link may be done using MCS to obtain a better chance of decoding, and, at the same time, to increase the duration of the transmissionin itself, thus, to maintain the channel busy. If a jammer periodically senses the wireless medium used for transmission of the data, the jammer may be attracted to the first link, while creating a sufficient long-time protection window for the transmission of for example a critical data packet comprised in the data to be transmitted over the second link.

Figure 4:
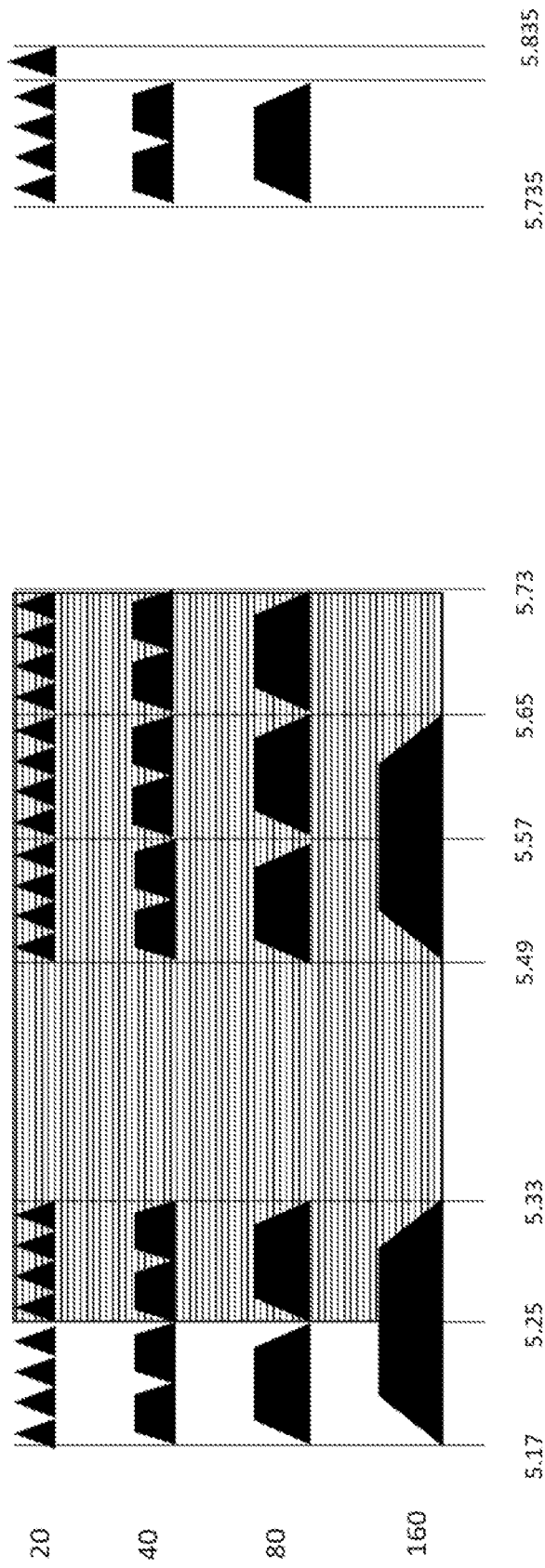
FIG. 4 illustrates an exemplary embodiment of a use case comprising an apparatus with multi-link capabilities.

FIG. 4 illustrates an exemplary embodiment of a use case with 802.11-compliant apparatus, that is an access point, and another apparatus with multi-link capabilities and ultra-reliable low latency communication, URLLC, traffic. In this exemplary embodiment, a link can be interpreted as a channel of a single or multiple 20 MHz frequency bands aggregated up to 160 MHz, as is illustrated in vertical direction in the FIG. 4. The access point and the apparatus operate, in this exemplary embodiment, in multiple links located in different frequency bands such as 2.4 GHz, low-5 GHz, high-5 GHz or 6 GHz. As is illustrated in FIG. 4, the 555 MHz are divided in a number, which may be a high number, of channels of 20 MHz each, with the possibility of aggregating them to form channels up to 160 MHz.

Figure 5:
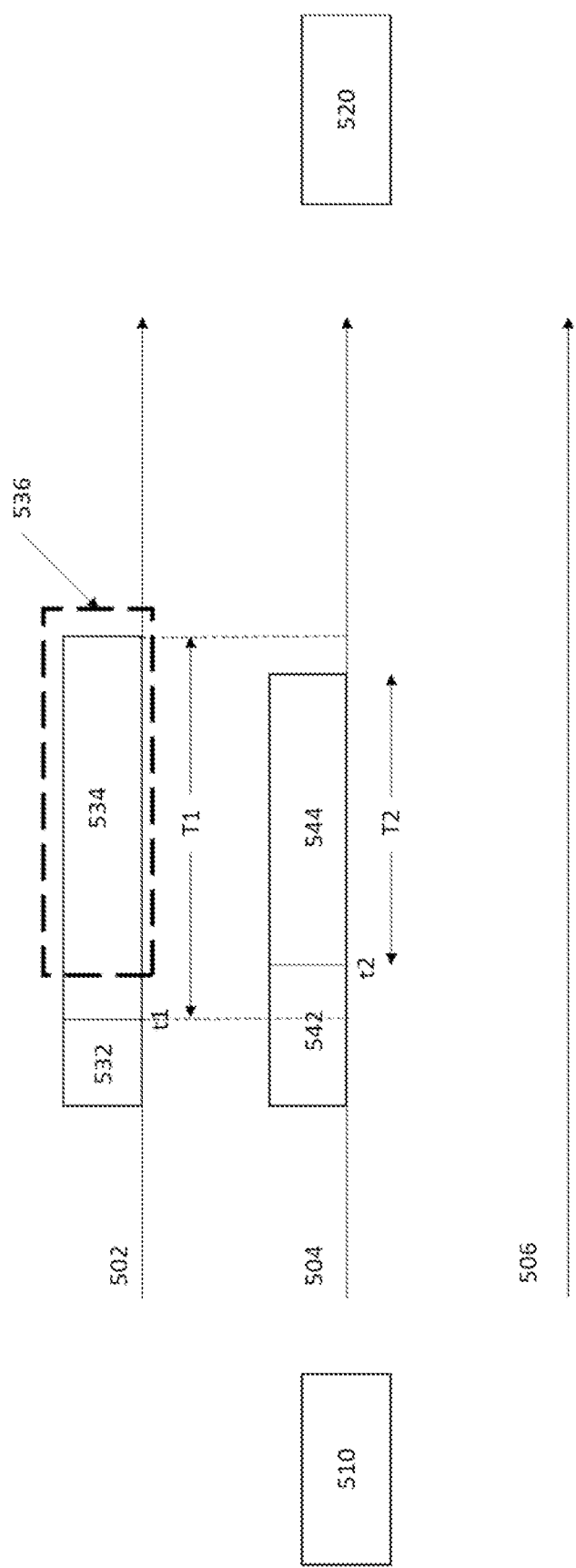
FIG. 5 illustrates an exemplary embodiment in which the presence of a reactive jammer is detected.

FIG. 5 illustrates an exemplary embodiment in which the presence of a reactive jammer is detected. In this exemplary embodiment, the reactive jammer operates with one operative radio transmitted. An apparatus compatible with the multi-link feature, the apparatus 510, is to transmit data. The apparatus 510 detects the presence of the reactive jammer. The presence may be detected using any suitable means. The data is to be transmitted to the apparatus 520 which is also compatible with the multi-link feature. After detecting the presence of a reactive jammer, the apparatus 510 postpones channel access. In other words, the apparatus 510 determines that interference may occur. Thus, the apparatus 510 obtains a first link of a first type, which in this exemplary embodiment is the link 502 that is an expected jammed link and a second link of a second type, which in this exemplary embodiment is the link 504 that is a non-jammed link. It is to be noted that in some exemplary embodiments, multiple link of the first and/or the second type may be obtained. The apparatus also postpones the transmission of the data, that is determined as the data to be transmitted. A duration of the transmission of the data when minimum MCS is applied is then determined. Then a duration T1 is determined such that T1 corresponds to min(TXOP,TMCSmin). TMCSmin is the duration of the transmission of the data when minimum MCS is applied and TXOP is the transmission opportunity.

The postponing is performed until transmission of the data may be initiated at time t1 in the expected jammed link with a duration T1 and transmission of the data in the non-jammed link 504 may be initiated in at time t2 that is greater than t1 with a duration T2 that is less than T1 and when t2+T2<t1+T1. The transmission of the data in the link 502 is done using minimum MCS, which may also be referred to as low MCS. The transmission in the expected jammed link 502 has the advantage of attracting the reactive jammer and thereby keeping busy its radio resources for at least T1 time window as is illustrated by the feature 536 in FIG. 5. The reactive jammer activates its interfering mask over link 502 once it detects ongoing transmission in the link 502. The attraction may thereby be used as a protected time window during which transmission may take place in link 504. For example, at least a critical URLLC data packet comprised in the data to be transmitted may be safely transmitted in the link 504. The transmission in link 504 may also be done using an appropriate MCS. For example, the data rate of the MCS of the second link may be higher than that of the first link.

The data to be transmitted in the expected jammed link 502 is in this exemplary embodiment the same data that is to be transmitted in the non-jammed link 504 but adopting minimum MCS to maximize the probability of correct reception, and allowing for the implementation of combining techniques at the receiver side. There is a listen before talk, LBT, part 532 that precedes the transmission of the data 534 in the link 502. There is also a listen before talk, LBT, part 542 that precedes the transmission of the data 544 in the link 504.

The selection of the expected jammed link and non-jammed link may be performed jointly by the apparatus 510. Once it is determined that data is to be transmitted, the multi-link apparatus 510 performs a check, among all the links and/or channels that it can address with its radio transmitters, which are the most suitable ones for completing the transmission of the data in that instant of time. When operating in the unlicensed spectrum, a link and/or channel may be used for example if a clear channel assessment, CCA, procedure provides a positive result that corresponds to not listening other ongoing transmissions during a period of time determined by a random back-off counter. It is to be noted that the apparatus 510 may perform an independent CCA processes on each of the link and/or channel it can address, thereby obtaining an overview of the links that have, or will gain shortly, a transmission opportunity, TXOP. It is also to be noted that LBT may be understood to be a mechanism by which an apparatus may apply clear channel assessment, CCA, before using the channel.

Figure 6:
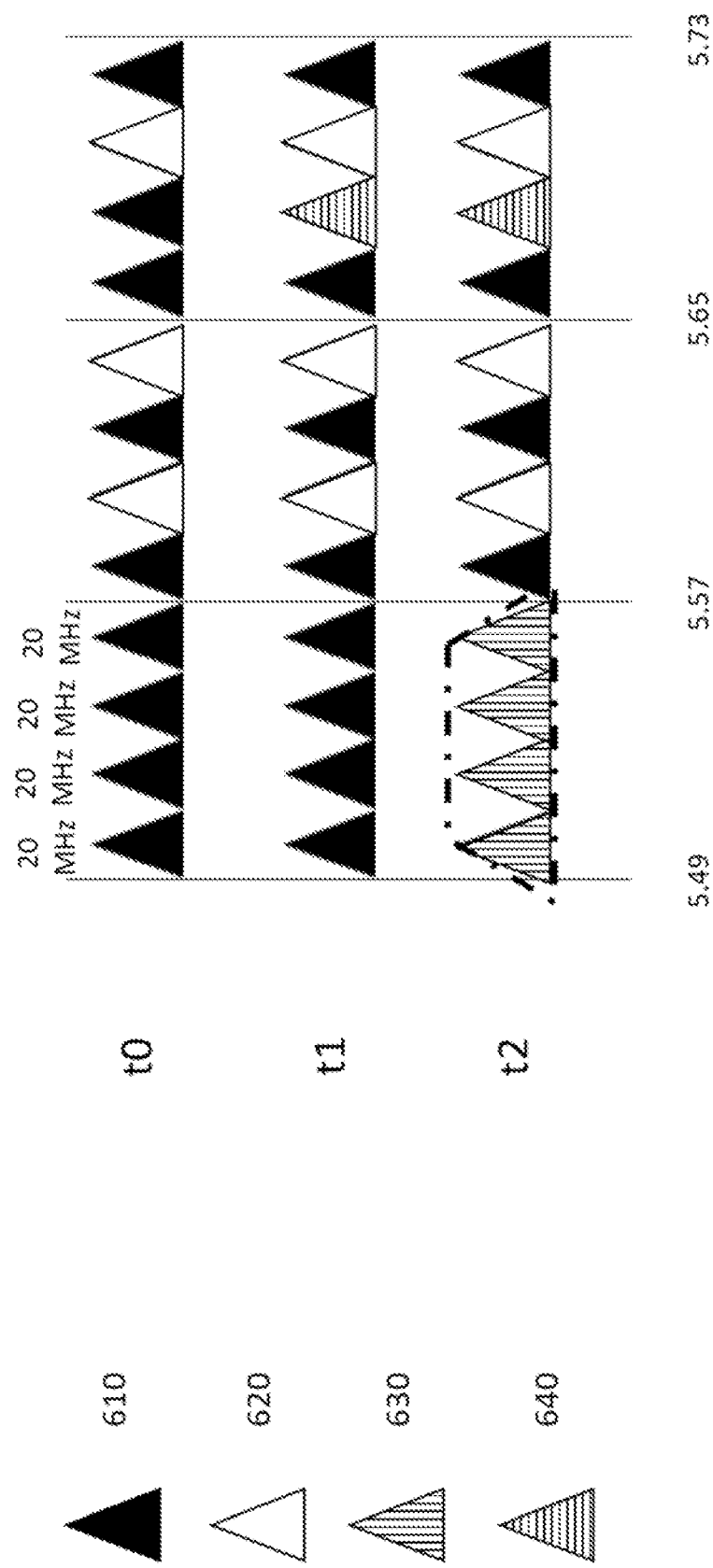
FIG. 6 illustrates an exemplary embodiment regarding the selection based on the bandwidth aggregation opportunity.

Among the links and/or channels that can be selected as a non-jammed link, the apparatus 510 retains the best available one in terms of received signal strength, RSS, and bandwidth aggregation opportunities for example. The best RSS may be determined to indicate the highest probability of successful reception of the transmitted data. FIG. 6 illustrates an exemplary embodiment regarding the selection based on the bandwidth aggregation opportunity. At time t0 the situation of the different links is illustrated. There are free links 610 and occupied links 620. A joint selection of expected jammed link 630 and non-jammed link 640 may be performed such that the data expected to be transmitted over the non-jammed link 640 may be transmitted over a wider spectrum, thus allowing for a reduced occupation of the wireless medium that may correspond to keeping T2 small. At t1, the expected jammed link 630 gains access to the channel and starts to transmit and at time t2 the non-jammed link 640 gains access to the channel and starts to transmit. In this exemplary embodiment, the maximum bandwidth aggregation in the selected expected jammed link would have been 40 MHz, while the selected non-jammed link could offer up to 80 MHz bandwidth, thereby resulting in a reduced transmission delay.

It is to be noted that in general two different aspects may need to be verified to jointly select one or more expected links and one or more non-jammed links. First, an RSS and bandwidth aggregation aspect as described above is to be verified. Secondly, an expected duration of the LBT in different links, which may correspond to the determination of t1 and t2 at which time instants transmission may start, in association with guaranteeing a condition in which t2+T2<t1+T1. The guaranteeing condition is a guaranteeing condition associated with time and may be, as mentioned above, t2+T2<t1+T1.

Figure 7:
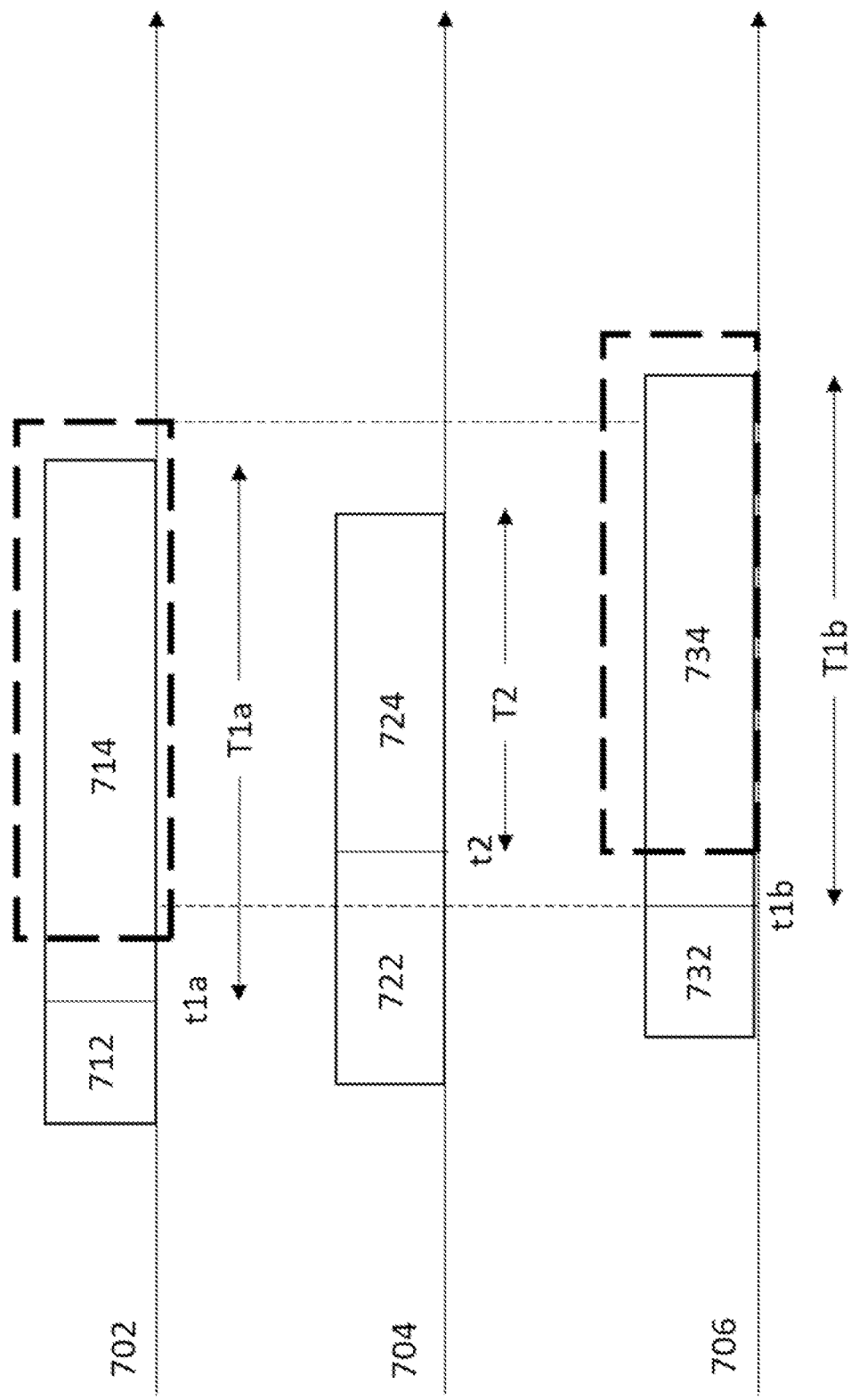
FIG. 7 illustrates an exemplary embodiment in which a reactive jammer has two radio transmitters that it may operate.

FIG. 7 illustrates an exemplary embodiment in which a reactive jammer has two radio transmitters that it may operate. The operation is illustrated using a dashed rectangular. In this exemplary embodiment, transmission of data in a non-jammed link 704 may be initiated after expected-jammed links 702 and 706 are occupied, i.e. after time t1$b$, and the transmission may last for a time T2<(t1$a$+T1$a$−t1$b$) to ensure safe transmission. The data to be transmitted in each link 714, 724 and 734 is preceded by the LBT part, respectively, 712, 722 and 732.

Figure 8:
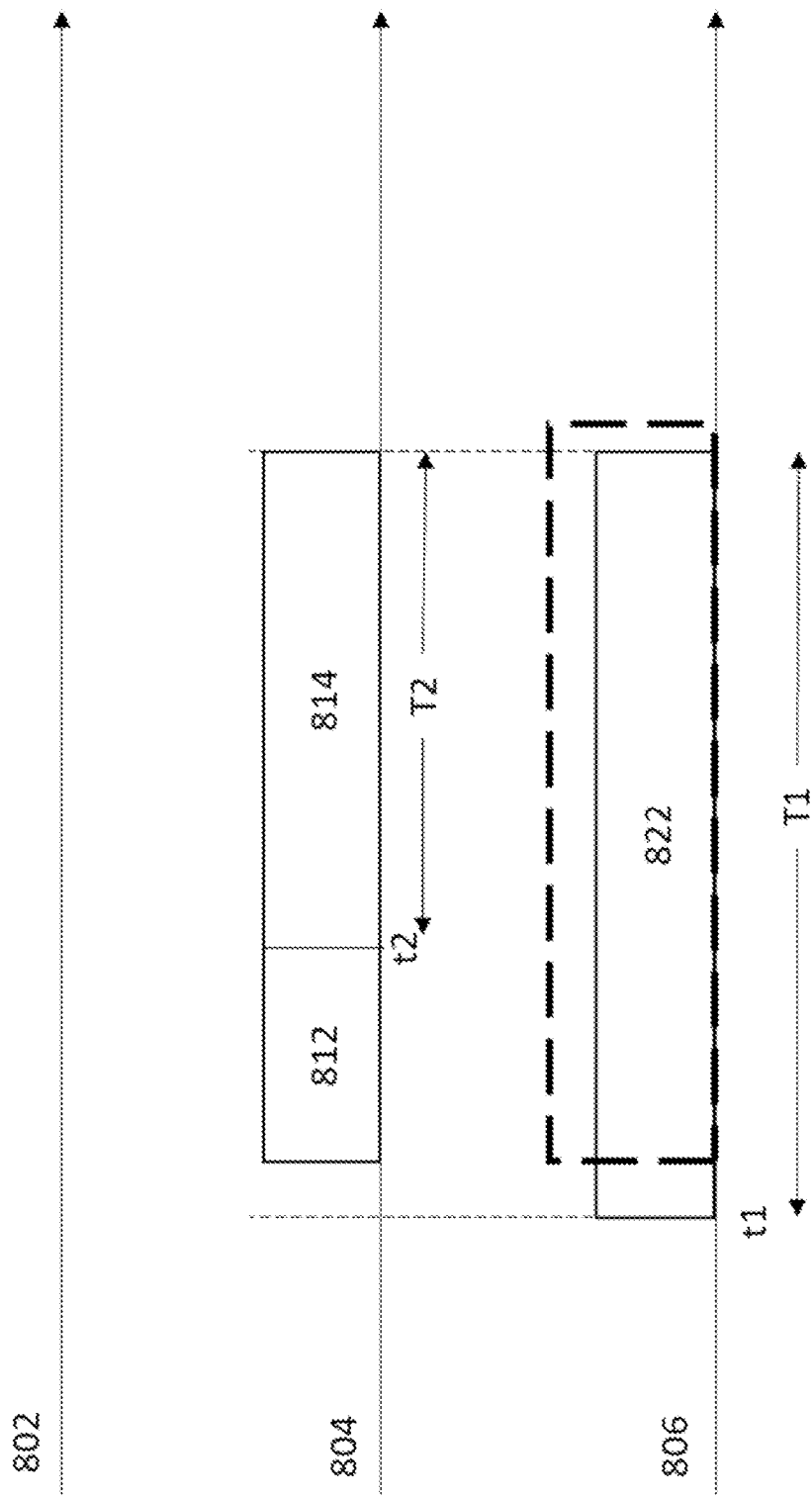
FIG. 8 illustrates an exemplary embodiment of utilizing an already ongoing transmission.

FIG. 8 illustrates an exemplary embodiment of utilizing an already ongoing transmission which has already attracted a reactive jammer, and deemed the link in which this transmission is ongoing as expected jammed link. The attracting may be ongoing and may be intentional or unintentional. In this exemplary embodiment, the apparatus 510 utilizes other already ongoing transmissions performed by other apparatuses. This may be done for example by decoding from a Network Allocation Vector, NAV, the expected transmission duration T1 on the expected jammed link 806, and selecting the non-jammed link, in this example 804, to ensure that the transmission initiating at t2 and with duration T2 is completed before the NAV of the expected jammed link 806 expires. Thus, in this exemplary embodiment, obtaining a link of a first type, that in this exemplary embodiment is the expected jammed link, may be understood as decoding from the NAV the expected transmission duration T1. In FIG. 8 the link 802 is not used but it is to be noted that in some other exemplary embodiments it could be utilized as another expected jammed link in case the ongoing transmission in link 806 is deemed by the apparatus 510 not sufficient to attract all the radio resources of the reactive jammer, for example because the reactive jammer is capable to transmit simultaneously in more than one link. The data to be transmitted 814 begins, in this exemplary embodiment, at time t2 and the duration of the transmission is T2. Before the transmission is initiated, LBT 812 is performed. At the time t1 there is ongoing transmission 822 in link 806 and the duration of that transmission is T1. The activity of the reactive jammer is indicated by the dashed rectangular. In this exemplary embodiment there is an advantage that there is a possibility to avoid duplication of data packets comprised in the data to be transmitted over multiple links and, accordingly, reduced utilization of the wireless medium. Yet, if it is determined that there are no other transmissions ongoing in the link 806, in this exemplary embodiment, the apparatus 510 may default to the approach described in the previous exemplary embodiments.

In a further exemplary embodiment, a combination of the exemplary embodiments described above may be utilized. For example, if the reactive jammer is capable of transmitting over the same number of links as the multi-link devices it may be determined that it is advantageous to take an advantage of other ongoing transmissions which are already keeping busy part of the radio resources of the jammer.

Figure 9:
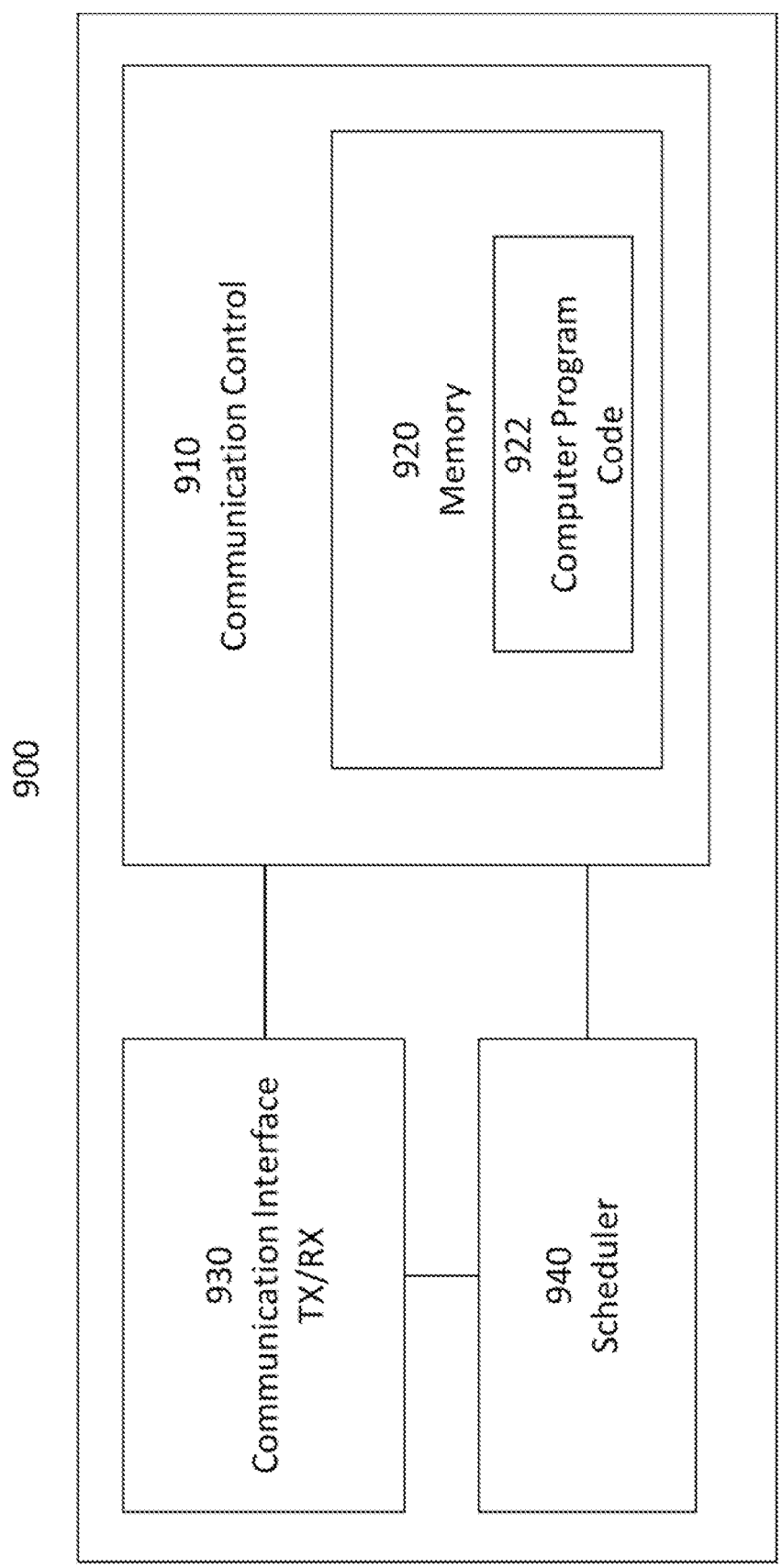
FIG. 9 and FIG. 10 illustrate exemplary embodiments of an apparatus.

The apparatus 900 of FIG. 9 illustrates an example embodiment of an apparatus that may be an access node or be comprised in an access node. The apparatus may be, for example, a circuitry or a chipset applicable to an access node to realize the described embodiments. The apparatus 900 may be an electronic device comprising one or more electronic circuitries. The apparatus 900 may comprise a communication control circuitry 910 such as at least one processor, and at least one memory 920 including a computer program code (software) 922 wherein the at least one memory and the computer program code (software) 922 are configured, with the at least one processor, to cause the apparatus 900 to carry out any one of the example embodiments of the access node described above.

The memory 920 may be implemented using any suitable data storage technology, such as semiconductor-based memory devices, flash memory, magnetic memory devices and systems, optical memory devices and systems, fixed memory and removable memory. The memory may comprise a configuration database for storing configuration data. For example, the configuration database may store current neighbour cell list, and, in some example embodiments, structures of the frames used in the detected neighbour cells.

The apparatus 900 may further comprise a communication interface 930 comprising hardware and/or software for realizing communication connectivity according to one or more communication protocols. The communication interface 930 may provide the apparatus with radio communication capabilities to communicate in the cellular communication system. The communication interface may, for example, provide a radio interface to terminal devices. The apparatus 900 may further comprise another interface towards a core network such as the network coordinator apparatus and/or to the access nodes of the cellular communication system. The apparatus 900 may further comprise a scheduler 940 that is configured to allocate resources.

Figure 10:
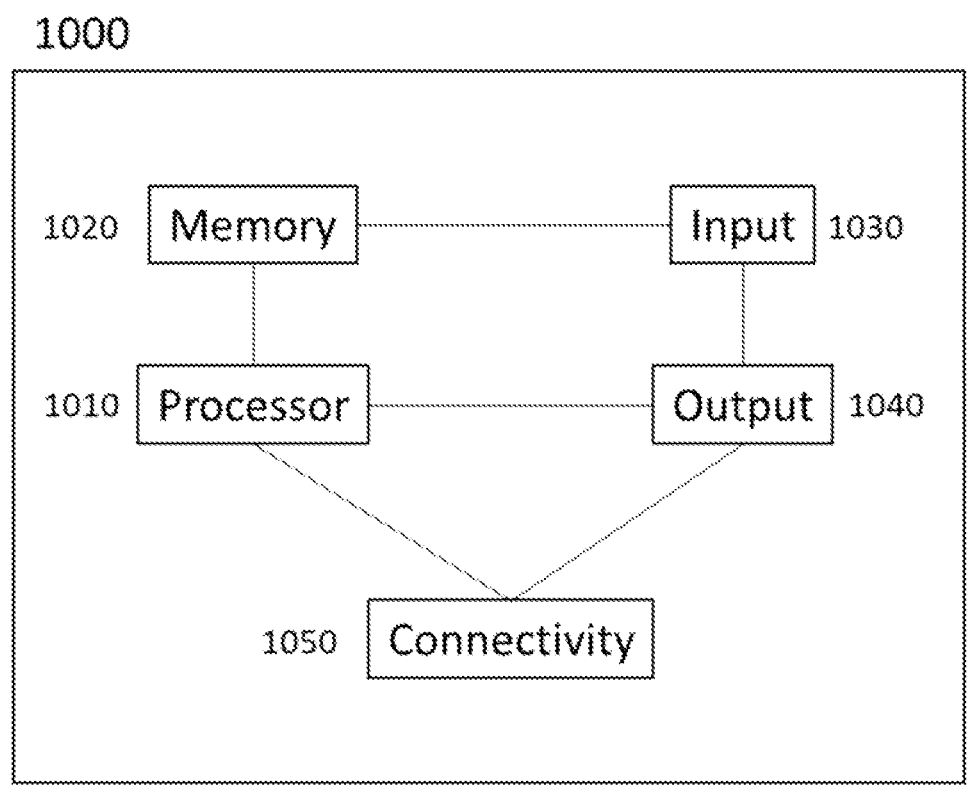

FIG. 10 illustrates an apparatus 1000, which may be an apparatus such as, or comprised in, a terminal device, according to an example embodiment. The apparatus 1000 comprises a processor 1010. The processor 1010 interprets computer program instructions and processes data. The processor 1010 may comprise one or more programmable processors. The processor 1010 may comprise programmable hardware with embedded firmware and may, alternatively or additionally, comprise one or more application specific integrated circuits, ASICs.

The processor 1010 is coupled to a memory 1020. The processor is configured to read and write data to and from the memory 1020. The memory 1020 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 1020 stores computer readable instructions that are execute by the processor 1010. For example, non-volatile memory stores the computer readable instructions and the processor 1010 executes the instructions using volatile memory for temporary storage of data and/or instructions.

The computer readable instructions may have been pre-stored to the memory 1020 or, alternatively or additionally, they may be received, by the apparatus, via electromagnetic carrier signal and/or may be copied from a physical entity such as computer program product. Execution of the computer readable instructions causes the apparatus 1000 to perform functionality described above.

In the context of this document, a "memory" or "computer-readable media" may be any non-transitory media or means that can contain, store, communicate, propagate or transport the instructions for use by or in connection with an instruction execution system, apparatus, or device, such as a computer.

The apparatus 1000 further comprises, or is connected to, an input unit 1030. The input unit 1030 comprises one or more interfaces for receiving a user input. The one or more interfaces may comprise for example one or more motion and/or orientation sensors, one or more cameras, one or more accelerometers, one or more microphones, one or more buttons and one or more touch detection units. Further, the input unit 1030 may comprise an interface to which external devices may connect to.

The apparatus 1000 also comprises an output unit 1040. The output unit comprises or is connected to one or more displays capable of rendering visual content such as a light emitting diode, LED, display, a liquid crystal display, LCD and a liquid crystal on silicon, LCoS, display. The output unit 1040 may comprise two displays to render stereoscopic visual content. One display to render content to the left eye and the other display to render content to the right eye. The output unit 1040 may further comprise a transmission unit, such as one or more waveguides or one or more lenses, to transfer the rendered visual content to the user's field of view. The output unit 1040 further comprises one or more audio outputs. The one or more audio outputs may be for example loudspeakers or a set of headphones.

The apparatus 1000 may further comprise a connectivity unit 1050. The connectivity unit 1050 enables wired and/or wireless connectivity to external networks. The connectivity unit 1050 may comprise one or more antennas and one or more receivers that may be integrated to the apparatus 1000 or the apparatus 1000 may be connected to. The connectivity unit 1050 may comprise an integrated circuit or a set of integrated circuits that provide the wireless communication capability for the apparatus 1000. Alternatively, the wireless connectivity may be a hardwired application specific integrated circuit, ASIC.

It is to be noted that the apparatus 1000 may further comprise various component not illustrated in the FIG. 10. The various components may be hardware component and/or or software components.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:
   at least one processor; and
   at least one memory including a computer program code,
      wherein the at least one memory and the computer program code are configured, with the at least one processor, to cause the apparatus to:
         determine that interference may occur in a wireless network the apparatus is connected to, wherein determining that interference may occur in the wireless network the apparatus is connected to comprises detecting a jammer;

obtain a first link that is of a first type;

obtain a second link that is of a second type;

determine data to be transmitted to another apparatus connected to the wireless network;

determine that a transmission occurs in the first link; and transmit the data in the second link during the transmission in the first link wherein the transmission in the first link has a longer duration than transmitting the data in the second link and the transmission in the first link and transmitting the data in the second link overlap in time, such that the transmitting the data in the second link is completed prior to completion of the transmission in the first link, and wherein the transmission in the first link comprises transmitting the data in the first link using a modulation and coding scheme that has a lower data rate than a modulation and coding scheme of the second link.

2. The apparatus according to claim 1, wherein the apparatus operates in a multi-link mode and the first link and the second link are part of a multi-link operation.

3. The apparatus according to claim 1, wherein the at least one memory and computer program code are further configured, with the at least one processor, to cause the apparatus to postpone channel access after detecting the jammer.

4. The apparatus according to claim 1, wherein transmitting the data in the second link is initiated when the transmission in the first link is ongoing.

5. The apparatus according to claim 1, wherein obtaining the first link and obtaining the second link are performed jointly.

6. The apparatus according to claim 1, wherein the first link and the second link are obtained based, at least partly, on received signal strength, bandwidth aggregation opportunities or a guaranteeing condition associated with time.

7. The apparatus according to claim 1, wherein the transmission occurring in the first link is caused by a further apparatus, which is different than the apparatus and the another apparatus.

8. The apparatus according to claim 7, wherein the at least one memory and computer program code are further configured, with the at least one processor, to cause the apparatus to acquire a duration of the transmission occurring in the first link, that is caused by the further apparatus, and to determine the duration of transmitting the data in the second link based on the acquired duration of the transmission occurring in the first link.

9. The apparatus according to claim 1, wherein the jammer is a reactive jammer.

10. The apparatus according to claim 9, wherein the at least one memory and computer program code are further configured, with the at least one processor, to cause the apparatus to obtain at least one further link that is of the first type after determining that the jammer is capable of transmitting in a number of links that is higher than a determined number of links of the first type.

11. The apparatus according to claim 1, wherein the at least one memory and computer program code are further configured, with the at least one processor, to cause the apparatus to obtain at least one further link that is of the first type.

12. A method, comprising:

determining that interference may occur in a wireless network an apparatus is connected to, wherein determining that interference may occur in the wireless network the apparatus is connected to comprises detecting a jammer;

obtaining a first link that is of a first type;

obtaining a second link that is of a second type;

determining data to be transmitted from the apparatus to another apparatus connected to the wireless network;

determining that a transmission occurs in the first link; and transmitting the data in the second link during the transmission in the first link, wherein the transmission in the first link has a longer duration than transmitting the data in the second link and the transmission in the first link and transmitting the data in the second link overlap in time, such that the transmitting the data in the second link is completed prior to completion of the transmission in the first link, and wherein the transmission in the first link comprises transmitting the data in the first link using a modulation and coding scheme that has a lower data rate than a modulation and coding scheme of the second link.

13. The method according to claim 12, wherein the method operates in a multi-link mode and the first link and the second link are part of a multi-link operation.

14. The method according to claim 12, further comprising postponing channel access after detecting the jammer.

15. The method according to claim 12, wherein transmitting the data in the second link is initiated when the transmission in the first link is ongoing.

16. The method according to claim 12, wherein obtaining the first link and obtaining the second link are performed jointly.

17. The method according to claim 12, wherein the first link and the second link are obtained based, at least partly, on received signal strength, bandwidth aggregation opportunities or a guaranteeing condition associated with time.

18. A non-transitory computer readable medium comprising program instructions for causing an apparatus to perform at least the following:

determining that interference may occur in a wireless network an apparatus is connected to, wherein determining that interference may occur in the wireless network the apparatus is connected to comprises detecting a jammer;

obtaining a first link that is of a first type;

obtaining a second link that is of a second type;

determining data to be transmitted from the apparatus to another apparatus connected to the wireless network;

determining that a transmission occurs in the first link; and transmitting the data in the second link during the transmission in the first link, wherein the transmission in the first link has a longer duration than transmitting the data in the second link and the transmission in the first link and transmitting the data in the second link overlap in time, such that the transmitting the data in the second link is completed prior to completion of the transmission in the first link, and wherein the transmission in the first link comprises transmitting the data in the first link using a modulation and coding scheme that has a lower data rate than a modulation and coding scheme of the second link.

\* \* \* \* \*